United States Patent [19]

Azzam

[11] Patent Number: 4,916,182
[45] Date of Patent: Apr. 10, 1990

[54] ADHESIVE EMULSION COMPOSITION AND ACCOMPANYING COATED SUBSTRATES, SUCH AS PREPASTED WALL COVERINGS

[75] Inventor: Wegdan R. Azzam, Scarborough, Canada

[73] Assignee: Borden, Inc., Columbus, Ohio

[21] Appl. No.: 284,667

[22] Filed: Dec. 15, 1988

[51] Int. Cl.$^4$ .............................................. C08J 3/02
[52] U.S. Cl. ................................... 524/501; 523/201; 428/346
[58] Field of Search ........................ 524/501; 525/201

[56] References Cited

U.S. PATENT DOCUMENTS

| 3,247,171 | 4/1966 | Walker et al. . | |
|---|---|---|---|
| 4,059,552 | 11/1977 | Zweigle et al. . | |
| 4,355,073 | 10/1982 | Knightley . | |
| 4,361,452 | 11/1982 | Clarke et al. ........................ | 525/201 |
| 4,476,190 | 10/1984 | Clarke et al. ........................ | 525/201 |
| 4,487,864 | 12/1984 | Bermudez et al. . | |
| 4,639,395 | 1/1987 | Clarke et al. . | |
| 4,713,264 | 12/1987 | Clarke et al. . | |

FOREIGN PATENT DOCUMENTS

| 1144290 | 4/1983 | Canada . |
|---|---|---|
| 0008213 | 2/1980 | European Pat. Off. . |
| 0077618 | 4/1983 | European Pat. Off. . |
| 0131090 | 1/1985 | European Pat. Off. . |
| 0159132 | 10/1985 | European Pat. Off. . |
| 0178127 | 4/1986 | European Pat. Off. . |
| 0194857 | 9/1986 | European Pat. Off. . |
| 1376392 | 12/1974 | United Kingdom . |
| 2054628A | 2/1987 | United Kingdom . |

*Primary Examiner*—Joseph L. Schofer
*Assistant Examiner*—Mark D. Sweet
*Attorney, Agent, or Firm*—Sidney W. Millard; Kenneth R. Warburton

[57] ABSTRACT

The invention comprises an adhesive composition and accompanying coated substrate, such as prepasted wallpaper. The composition is formed from a low viscosity, wall in oil emulsion which comprises a mixture of at least two emulsions of substantially linear, water soluble, high molecular weight cationic and anionic polymers; the anionic polymers comprising monomers selected from anionic monomers and mixtures of anionic monomers with non-ionic monomers and the cationic polymers comprising monomers selected from cationic monomers and mixtures of cationic monomers with non-ionic monomers.

The adhesive composition and the coated substrates exhibit excellent qualities, particularly an improved resistance to excess water absorption during usage.

20 Claims, 2 Drawing Sheets

ADHESIVE EMULSION COMPOSITION AND ACCOMPANYING COATED SUBSTRATES, SUCH AS PREPASTED WALL COVERINGS

FIELD OF THE INVENTION

This invention relates to an adhesive composition suitable for coating on a substrate, such as a wall covering, and more particularly, to a mixture of emulsions of linear, water-soluble, high molecular weight, anionic and cationic polymers, which when mixed together form a low viscosity emulsion which is suitable for prepasting wall coverings, as well as for coating a variety of other substrates.

BACKGROUND AND PRIOR ART

A wide variety of compositions have been utilized as adhesives for wallpaper and related substrates, either as aqueous adhesive compositions that can be applied when required, or as a water-wettable prepasted adhesive.

The traditional methods for applying such prepasted wall coverings, however, display a tendency to absorb an excess quantity of water during soaking of the sheet before hanging, even though the process is intended to be very simple to operate. Consequently, the paper hanger has to exercise care during prewetting to prevent excess water absorption. Consequently, he must be careful to minimize the soaking time, which is usually ten to twenty seconds. In the present invention an excess amount of water is not absorbed, thus eliminating the problem of the water running down the wall and making the surface both dirty and sticky. This can be particularly desirable during, e.g., the hanging of wallpaper borders which are located either close to the ceiling or in the middle of the wall.

There is a multitude of related prior art in this well-worked technology; U.S. Pat. No. 4,476,190 and its European Application counterpart 077,618 disclose a variation of the composition which is utilized in the invention; however, the system disclosed therein relates to a mixture of water insoluble cationic and anionic polymers, both of which are cross-linked. Additionally, although the adhesive system disclosed does exhibit a small decrease in water absorption over time, it does not completely stop its absorption of water.

U.S. Pat. No. 4,713,264 discloses that water soluble adhesives can be utilized to coat wallpaper; however, at least seventy percent of the particles in the composition disclosed are crosslinked, i.e, a maximum of only thirty percent of the composition is water soluble.

U.S. Pat. No. 4,355,073 and its British counterpart, 2,054,628A disclose a water soluble polymer which is preferred for use as the anionic component of the mixture of the present invention. However, the resulting adhesive system exhibits no gel strength and the water soluble polymer is degradable by shear forces, as is pointed out in U.S. Pat. Nos. 3,247,171 and 4,059,552.

European Application 194,857 utilizes a suspension polymerization method to prepare adhesive polymers which are suitable for usage in wallpaper adhesive coating compositions and the like. Consequently, substantially all of the particles must have a particle size greater than twenty microns, which is not desirable in the emulsion polymerization methods of the present invention.

U.S. Pat. No. 4,361,452 and its foreign counterparts, European Application 8,213 and Canadian patent 1,144,290 disclose the utilization of water insoluble and water swellable polymers which are prepared by inverse emulsion polymerization and which form a wallpaper adhesive. The resulting polymers are cross-linked and the final suspension may contain a water soluble polymer which reduces the viscosity of the composition. However, this polymer must have the same polarity as the swollen polymer; the liquid suspension is supplied as a suspension of particulate polymers which are dispersed in an organic liquid.

European Application 178,127 and the previously cited U.S. Pat. No. 4,713,264 each disclose a method of water distillation suitable for use in the present invention. Also disclosed are the characteristics of the oil in the polymeric stabilizer which is added to assist the azeotropic distillation.

U.S. Pat. No. 4,487,864 and European Application 131,090 disclose a carbohydrate polymer in conjunction with a cross-linked water swellable polymer, such as a partially hydrolized cross-linked polyacrylamide, which is suitable as a wallpaper adhesive.

European Application 159,132 discloses a layered adhesive coating in which the first layer is a cross-linked, anionic polymer which swells only in an alkali media, while the second layer is an aminoalkyl-containing, linear, low molecular weight cationic polymer.

Mixtures of cross-linked anionic polyacrylamide and water soluble cationic polymers are disclosed in British patent 1,376,392. The resulting mixture exhibits improved adhesion when compared to the aforementioned anionic polymer.

Unfortunately, all of these wallpaper adhesive systems absorb an undesirable amount of water during excess soaking of the sheet before hanging, thereby requiring the wallpaper hanger to exercise care during the wetting process, even though the process of applying the wallpaper is intended to be very simple to operate. Accordingly, there has arisen a need for an adhesive composition which when soaked will absorb water only for a short period of time, after which significant further water absorption substantially ceases. Additionally, the adhesive imparts a hydrophilic character to the coated article, thereby enabling it to adhere to a variety of substrates such as glass, cellulose and the like. The blends of the invention can also be utilized in such diverse environments as photographic films, separation membranes, surgical implants, soft contact lenses, and as a grease resistant film.

In addition to the aforementioned advantages, it is desireable to utilize an adhesive composition which can be fabricated in a particular desired blend at the site of application and can also be used in applications where water retaining is desirable, such as in sandy soils, as well as in applications such as enhanced oil recovery, hydraulic fracturing of subterrane formations, and as a viscosity builder.

SUMMARY OF THE INVENTION

The invention comprises, in a first aspect, a low viscosity, water in oil emulsion comprising a mixture of at least two emulsions of substantially linear, water soluble, high molecular weight cationic and anionic polymers; the anionic polymers comprising monomers selected from anionic monomers and mixtures of anionic monomers with non-ionic monomers and the cationic polymers comprising monomers selected from cationic monomers and mixtures of cationic monomers with non-ionic monomers.

The invention further comprises, in a second aspect, a substrate coated with a water wettable adhesive coating. The coating includes a low viscosity, water in oil emulsion comprising a mixture of at least two emulsions of substantially linear, water soluble, high molecular weight cationic and anionic polymers. The anionic polymers include monomers selected from anionic monomers and mixtures of anionic monomers with non-ionic monomers and the cationic polymers comprising monomers selected from cationic monomers and mixtures of cationic monomers with non-ionic monomers.

BRIEF DESCRIPTION OF THE DRAWINGS

Various objects, features and attendant advantages of the present invention will be more fully appreciated as the same becomes better understood when considered in connection with the accompanying drawings, wherein.

DETAILED DESCRIPTION OF THE INVENTION

Figure 1:
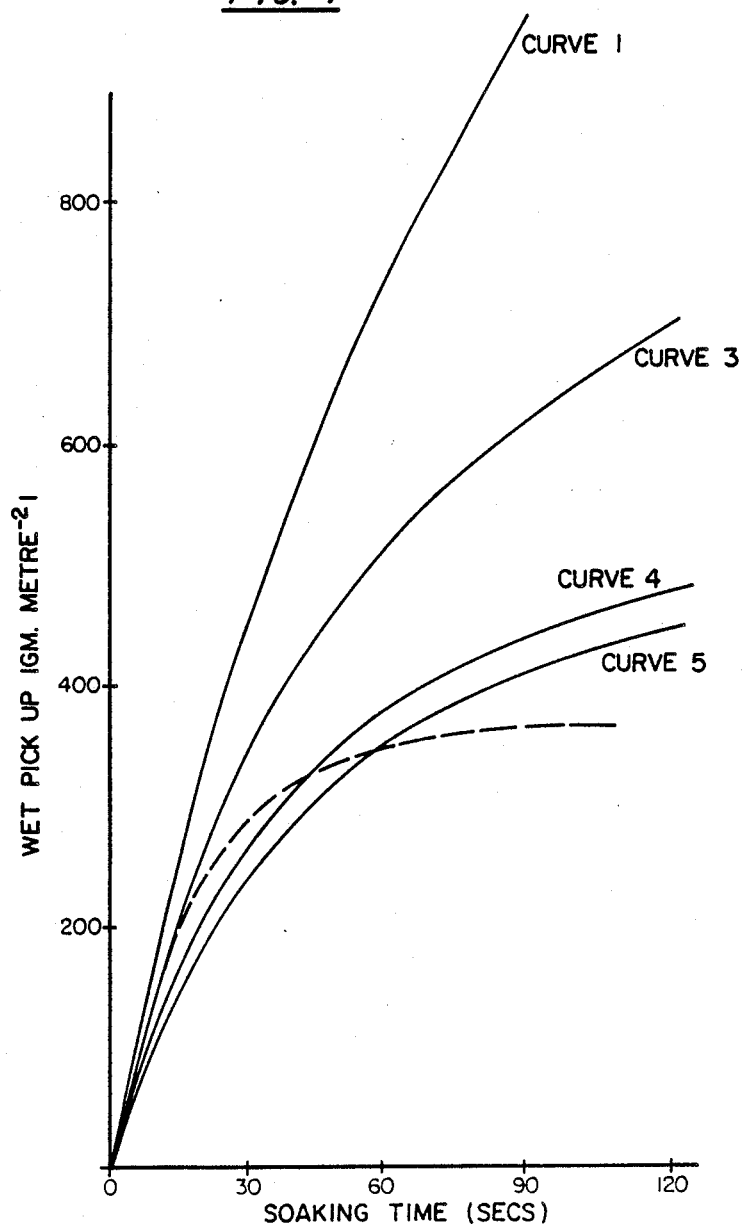
FIG. 1 is the FIG. 1 of U.S. Pat. No. 4,476,190, having additionally superimposed thereon a dotted line plot of the water absorption characteristics vs. soaking time of a particular adhesive composition of the invention.

The invention, in the broadest embodiment, relates to an adhesive composition which is a mixture of at least two emulsions of linear, i.e., non cross-linked, water soluble, high molecular weight blends and is particularly useful as an adhesive for coating wallpaper and a variety of other substrates. The dry adhesive coatings, when wetted, form a substantially insoluble film which is particularly suitable as an adhesive wallpaper or the like. Although applicant does not wish to be bound by theory, it appears that during mixing an interaction takes place between the ionic polymers that form the insoluble blend; the degree of insolubility, i.e., the degree of swellability can be easily controlled by simply changing the ratio of cationic to anionic polymers which are present in the mixture. Additionally, the adhesive compositions of the invention do not require the presence of an expensive inverter, such as the class of high HLB surfactants which are disclosed in Canadian patent 1,144,290.

A particularly surprising property of the invention is that when a coating of the adhesive is applied to a substrate, having been dried and soaked in water before application, the resultant swollen film, upon soaking, will absorb water up to a maximum of about thirty seconds, after which the polymer blend will become saturated and cease absorbing water. The resulting film will remain at approximately the same weight, regardless of whether or not it has been left in the water for a longer period of time. This is in sharp contrast to other systems disclosed in the prior art, and especially U.S. Pat. No. 4,476,190, which will continue to absorb unneeded water and thus develop undesired characteristics.

The adhesive compositions of the invention are synthesized by inverse emulsion polymerization, in which the aqueous monomer phase is dispersed into the oil phase by utilizing high shear mixing and polymerizing. In a preferred embodiment, the adhesive composition preferably forms a prepasted wall covering that comprises a sheet substrate such as wallpaper, which is coated by the adhesive composition that is made from the two aforementioned classes of anionic and cationic polymeric materials.

More particularly, by utilizing an emulsion formed from a mixture of linear cationic and anionic polymers, the water absorption properties are improved, particularly with respect to limiting the total amount of water that can be absorbed after saturation, i.e., after reaching the saturation absorption level of the composition. Consequently, the adhesive coating is much more stable when exposed to a prolonged soaking, so there is almost no possibility of absorbing undesired water during use.

Each of the two classes of ionic polymers is formed from a polymerized monomer, or monomer mixture, which is capable of providing linear, i.e., non cross-linked, high molecular weight, water soluble polymers. Each class of polymers is individually water soluble, but when the two classes are each formed into separate emulsions and mixed together, they surprisingly form a low viscosity emulsion, the resultant coatings of which are insoluble, water swellable and have no need to utilize a cross-linking agent.

Suitable anionic monomers include those formed from acrylic acid or its water-soluble salts, methacrylic acid or its water soluble salts, and other anionic monoethylenically unsaturated monomers.

Suitable cationic monomers include those formed from aminoalkyl derivatives of acrylamide, methacrylamide, acrylic acid or methacrylic acid. These derivatives can also be quaternized, although this is not preferred.

Each polymer can be a homopolymer or it can be a copolymer having the particularly desired ionic properties. For instance, the polymer can comprise a copolymer of a cationic (or anionic) monomer with a non-ionic monomer, such as acrylamide or methacrylamide. Usually the anionic polymer is highly anionic and contains up to 50 mole%, preferable 10–30 mole% of non-ionic monomer. The cationic polymer, however, is substantially non-ionic in character, containing about 5–40 mole%, preferably 10–30 mole% of cationic monomer.

The water absorption characteristics of the coated substrates can be varied by changing the particular polymers utilized, particularly by changing the relative proportions of the polymers. Useful results can be obtained by utilizing anionic to cationic copolymers in proportions which can range from 95–5 wt% to 50–50 wt% of anionic to cationic, with the most preferred range comprising 10–30% of cationic polymer.

In the most preferred embodiment, the adhesive composition comprises an anionic copolymer of 70–90 mole% acrylic acid or its sodium salt, with the remaining 10–30 mole% being acrylamide, while the cationic copolymer comprises dimethyl amino methacrylate and its quaternized product with dimethyl sulfate, which is then copolymerized with 70–90 mole% acrylamide.

As mentioned, supra, each of the polymers is preferably prepared by utilization of inverse emulsion polymerization methods, e.g., such as are described in European Patent Publication 8,213. In this method, an emulsion is formed by dispersing an aqueous solution of the desired monomers in an organic liquid by utilizing a high shear mixer and polymerization is then conducted so as to form a dispersion of water swollen polymer particles which are dispersed in the organic liquid. The degree of polymerization is preferably at least in excess of one million. Although it is not preferred that the particles should be dry, the dispersion may be dehydrated, for instance by azeotropic distillation, as set forth in U.S. Pat. No. 4,713,264, so as to remove a desired amount of the water which is present.

Although not preferred, the resulting dispersion of dry or swollen particles can be incorporated directly into the composition that is to be coated onto the desired substrate, e.g., by being blended with the corresponding dispersion of the other polymer and optionally with an additional organic liquid carrier, provided that the carrier utilized for the polymerization is sufficiently volatile and is otherwise suitable for the coating and evaporation stages. If it is not suitable, then the polymer particles may be separated from the carrier and redispersed, either dry or while swollen, in a suitable carrier in known manner. However, the preferred method is to form the two types of polymers separately as emulsions and then to mix the emulsions.

In a preferred method of preparation, the water soluble monomers are initially dissolved in water to form at most a 50% solids solution. A chelating agent is then added so as to deactivate any inhibitors of a metallic nature, while the pH of the water phase is adjusted by utilizing either a suitable amount of sodium hydroxide (a pH of about 4.5) or sulfuric acid (a pH of about 6.5); care being exercised to control the resulting heat of neutralization.

In a separate step, a suitable paraffinic oil is mixed with a suitable surfactant. Suitable paraffinic oils include aliphatic or halogenated hydrocarbons, mineral oils, kerosenes and naphtha. Also, in certain instances aromatic hydrocarbons such as benzene xylene, toluene and the like can also be utilized. The preferred oil is "Isopar M" made by Esso Chemical Canada of Toronto, which is a mixture of high boiling paraffins.

Suitable surfactants include Sorbitan tristearate, ethylene or propylene glycol fatty acid ester, Sorbitan sesquiolate, glycerol monostearate, sorbitan monopalmitate, sorbitan monolaurate or mixtures thereof. Usually any surfactant or surfactant mixture having an HLB value ranging from 2-8 is suitable for usage. The preferred surfactant is sorbitan monooleate.

The two resulting phases are then mixed together to form a coarse emulsion. The ratio of water to oil is adjusted so as to obtain an emulsion of desired viscosity, opacity and stability.

The emulsion is next subjected to high shear so as to create the desired range of particle sizes, typically ranging from about 2 to 5 microns in size. The apparent viscosity of the resulting emulsion ranges from about 300 to 1000 cp, preferably about 400 to 700 cp, when measured with a Brookfield viscometer, utilizing spindle number 2 rotating at 6 r.p.m.

The emulsion is then deaerated by purging with nitrogen or another suitable inert gas. The reaction is preferably initiated by utilizing a redox system comprising tertiary butyl hydroperoxide sodium metabisulfite and optionally ferrous ammonium sulfate, while the heat of polymerization is carefully monitored. The reaction is carried out until the evolution of heat has ceased.

The molecular weights of the formed polymers typically range from about 1-20 million, preferably about 4-10 million, viscosity-average molecular weight.

The maximum amount of water which can be absorbed by each particle is dependent upon the particular ratio of anionic to cationic polymers in the blend.

It is essential that the liquid compositions of the invention be substantially aqueous, so that the two classes of ionic polymers will react with each other while in the liquid emulsion. The emulsion should contain a sufficient amount of water to dissolve the polymeric particles and allow them to interact, but the continuous phase of the emulsion must be substantially anhydrous, since if it contains water the particles will stick to one another and interact before intended usage.

The cationic and anionic emulsions are blended by mixing in the desired proportions, as cited, supra. The resulting emulsion displays physical properties which are in most aspects similar to the individual emulsions that it was prepared from; however, the viscosity of the resulting emulsion is as low as the viscosity of the individual components, while also having comparable stability.

The adhesive compositions of the invention are preferably utilized in relatively small amounts, typically having coating weights which range from about 2 to 8 $g/m^2$, and most preferably, about $5g/m^2$. The coating is preferably applied by utilizing any of a variety of known techniques. The desired drying temperature utilized can be determined from the particular ratio of polymers selected and the required physical properties of the coated substrates.

The adhesive compositions of the invention can also include additional elements which facilitate the formation of the composition or which improve the particular properties of the resulting coatings. For example, the compositions may include a film forming polymeric material for adjusting the adhesion properties of the adhesive coating and they may also include a viscosity modifier which can either adjust the properties of the composition during application to the substrate, or adjust the properties of the adhered coating. A variety of known polymers may be used for such purposes.

A coated substrate, preferably wallpaper, but which can also include glass, cellulosic fibers or the like can be formed by initially applying to the substrate, e.g., wallpaper, the aforementioned emulsion containing the mixture f cationic and anionic polymers. The coating is applied preferably uniformly, but forms a discontinuous film of dry polymer particles which further contains dry interspaces which were originally filled with oil and water. The resulting coated substrate can be used in conventional manner, with the coating being wetted with water when desired to bond the substrate to a wall or another desired surface. Wetting of the coated composition results in the coating absorbing water and the particles swelling and forming an adhesive coating. A certain amount of bridging or coalescing between the particles can occur, as well as a small amount of chemical interaction, but this is not deleterious. It is particularly surprising that not only do the coatings exhibit superior rates and controlled amounts of water absorption, but also are particularly stable to a prolonged soaking.

Figure 2:
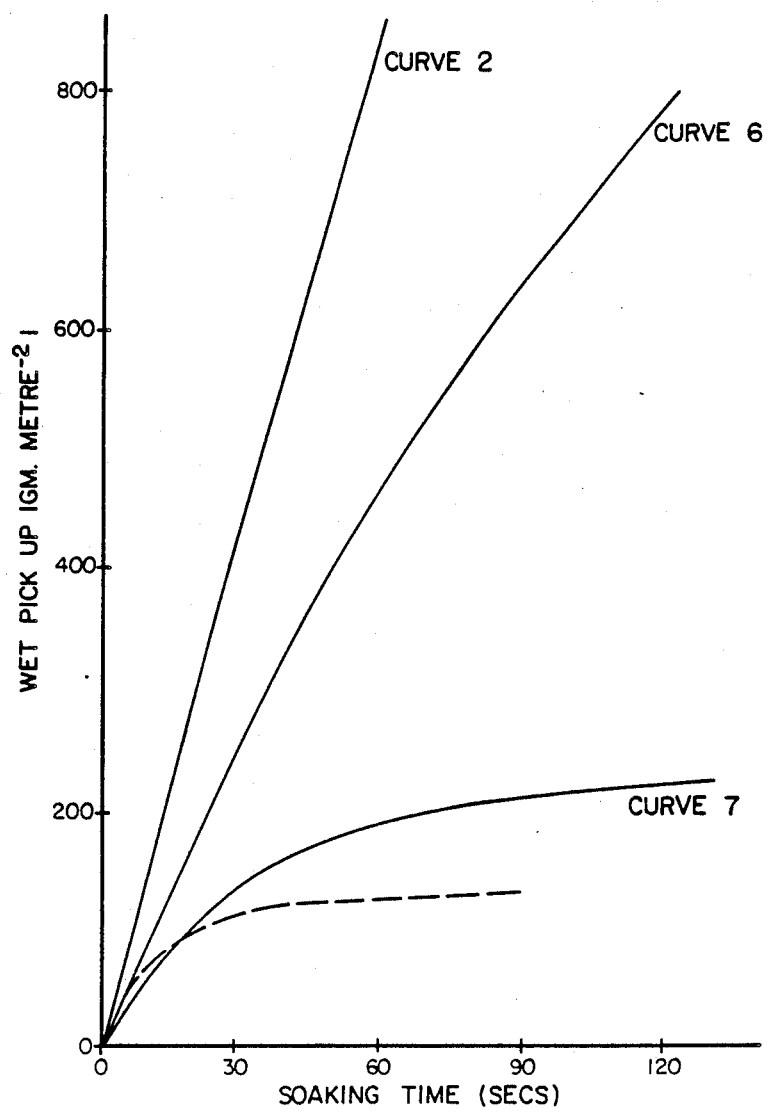
FIG. 2 is the FIG. 2 of the U.S. Pat. No. 4,476,190, having again superimposed thereon a dotted line plot of another adhesive composition of the invention.

FIGS. 1 and 2 each illustrate the aforementioned improved performance to prolonged soaking, which is exemplified by a levelling off in water absorption at a critical saturation concentration, of two coated emulsion compositions of the invention as compared with several preferred compositions disclosed in U.S. Pat. No. 4,476,190. As is clearly set forth in the two Figures, all of the prior art absorption data, except for the composition of curve 7 in FIG. 2, display a steady increase with time in the amount of water absorbed. Furthermore, in curve 7, which displays the desired horizontal plateau, indicating that no additional water absorption occurs, the particular composition tested comprised 90% of the more expensive cationic polymer.

FIG. 1 also plots another coated emulsion composition of the invention, which is a mixture of two linear ionic polymers which have been mixed in an 85 to 15 wt% anionic to cationic ratio. As is seen in the Figure (dotted line), the desireable flat portion of the resulting absorption curve can be observed.

In FIG. 2, the dotted line displays the absorption characteristics of a second adhesive composition of the invention which utilizes only about 45% of cationic component and still obtains superior absorption characteristics than the composition of curve 7 as described, supra, while utilizing only half as much of the more expensive cationic polymer. Furthermore, not only do the compositions of the invention display superior resistance to undesired water absorption, but also do not require the utilization of an inverter or high HLB surfactant, thereby reducing the cost of the adhesive composition. This is because inverters are surfactants which are utilized to increase the rate of dissolution or the water absorbency of the polymers. However, since the polymers of the invention are initially water soluble, they do not require the presence of an inverter.

A major advantage of the invention is that the particular properties of the adhesive composition can be easily adjusted by changing the particular ratios of cationic to anionic component. This is particularly desirable from a commercial standpoint, since it allows a great amount of versatility in forming the particular adhesive blend that is desired by the consumer. For example, the consumer can tailor the particular ratio of the two different emulsions for his specific requirements, and then easily mix the two emulsions to attain the desired adhesive blend, which is in stark contrast to other prior art systems.

An additional advantage of the adhesive compositions is the relative ease of application to the paper or other desired substrate which is to be coated. For example, the compositions can be applied by conventional printing equipment, such as flexographic, gravure, or rotary screen printing. Web inverters may be used to allow a continuous process, i.e., printing followed by a pasting which is carried out in a single operation. All of these methods are convenient for wallpaper manufacturers to operate and they also have the additional advantage of allowing superior control and uniform coating, which thus represents a considerable advantage over the traditionally utilized methods, such as starch dusting.

An additional advantage of the adhesive compositions and coatings of the invention is that the prepasted coatings can be subjected to hot embossing without any apparent effect on the remoistening properties. This also represents a considerable advantage over currently utilized starch base adhesives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLES

EXAMPLE 1

A linear sodium acrylate-acrylamide copolymer is prepared by mixing together 45 g of acrylic acid, 40 g of a 50% solution of acrylamide, 21 g of 40% sodium hydroxide, 140 g of water and 0.05 g of ethylene diamine tetra acetic acid. In a separate beaker, 98g of Isopar M were mixed with 9 g of sorbitan monooleate. The aqueous phase is mixed with the oil phase, and the so formed emulsion is subjected to high shear. The emulsion is the purged with nitrogen for an hour, after which tertiary butyl hydroperoxide (0.1 percent based on the weight of the monomer) is added. This is followed by gradual additions of solutions of metabisulfite while keeping the exotherm under control by introduction of a cooling batch whenever necessary. It is preferable to keep temperature below 45° C. The reaction is continued until no exotherm is observed.

EXAMPLE 2

A linear copolymer of acrylamide-dimethyl amino ethyl methacrylate (DMEMA) is prepared by mixing 90 g of 50% acrylamide with 25 g of DMEMA, 43 g of water, 16 g of 50% sulfuric acid and 0.05 g of ethylene diamine tetra acetic acid. Separately, 68 g of Isopar M were mixed with 5 g of sorbitan monooleate and 1 g of sorbitan monolaurate. The same polymerization procedure as utilized in Example 1 is then employed.

EXAMPLE 3

A blend of the anionic polymer of Example 1 and the cationic polymer of example 2 is formed by mixing the two emulsions at the ratio of 85/15 based on polymer weight. The wallpaper is then coated at 5 g/m$^2$ dry weight. The water absorption characteristics of this blend are shown as curve A in FIG. 1.

EXAMPLE 4

A 55/45 blend of the anionic and cationic polymers of Example 3 is prepared and coated as preferably described. The water absorption characteristics of the resulting coated adhesive are shown in curve B of FIG. 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof can make various changes and modifications of the invention to adapt it to various usages nd conditions.

Having thus described the invention, what is claimed is:

1. A water in oil emulsion composition which comprises a blended mixture consisting essentially of at least two emulsions of substantially linear, non cross-linked, water soluble, high molecular weight polymers, with
    one of said two emulsions consisting essentially of a water in oil emulsion whose water phase contains dissolved therein the substantially linear, non cross-linked, water soluble polymer which is an anionic polymer which is a homopolymer of an anionic monomer or a copolymer of two monomers, the one selected from anionic monomers and the other selected from non-ionic monomers, and an other of said two emulsions consisting essentially of a water in oil emulsion whose water phase contains dissolved therein the substantially linear, non cross-linked, water soluble polymer which is a cationic which is a homopolymer of a monomers selected cationic monomer or a copolymer of two monomers, the one selected from cationic monomers and the other selected from non-ionic monomers, and with said emulsion composition characterized after application to a substrate and drying to a discontinuous film upon water wetting by said discontinuous film swelling with water absorption and within about 30 seconds becoming substantially saturated and substantially ceasing to absorb water.

2. The emulsion composition of claim 1 having an apparent viscosity falling within about 300 to 1000 cp.

3. The emulsion composition of claim 1 which includes the anionic polymer in an amount from about 95–5% of the total weight of anionic and cationic polymers in the blended mixture.

4. The emulsion composition of claim 3 which includes the anionic polymer in an amount from about 90–70% of the total weight of anionic and cationic polymers in the blended mixture.

5. The emulsion composition of claim 1 wherein the blended mixture provides particles of the anionic and cationic polymers of sizes from about 2 to 5 microns.

6. The emulsion composition of claim 1 wherein the water phases include the anionic and cationic polymers having viscosity-average molecular weights within from about 1 to 20 million.

7. The emulsion composition according to claim 1 wherein the emulsion composition is further characterized by the absence of an inventor.

8. The emulsion composition according to claim 1 wherein the anionic monomers are selected from acrylic acid, methacrylic acid and their water soluble salts, the cationic monomers are selected from aminoalkyl acrylamides, aminoalkyl methacrylamides, aminoalkyl acrylates, aminoalkyl methacrylates and quaternized derivatives thereof and the non-ionic monomers are selected from acrylamide and methacrylamide.

9. A prepasted substrate comprising:
(i) a substrate; and
(ii) a water wettable adhesive coating on said substrate with said water wettable adhesive coating resulting from an applying, followed by a subsequent drying, to said substrate of a coating composition which is a water in oil emulsion composition which comprises a blended mixture consisting essentially of at least two emulsions of substantially linear, non cross-linked, water soluble, high molecular weight polymers, with one of said two emulsions consisting essentially of a water in oil emulsion whose water phase contains dissolved therein the substantially linear, non cross-linked, water soluble polymer which is an anionic polymer which is a homopolymer of an anionic monomer or a copolymer of two monomers, the one selected from anionic monomers and the other selected from non-ionic monomers; and an other of said two emulsions consisting essentially of a water in oil emulsion whose water phase contains dissolved therein the substantially linear, non cross-linked, water soluble polymer which is a cationic polymers which is a homopolymer of a cationic monomer or a copolymer of two monomers, the one selected from cationic monomers and the other selected from non-ionic monomers, and with said water wettable adhesive coating characterized upon water wetting by swelling with water absorption and within about 30 seconds becoming substantially saturated and substantially ceasing to adsorb water.

10. A prepasted substrate according to claim 9 wherein the substrate is selected from paper, glass and a cellulosic fabric.

11. A prepasted substrate according to claim 9 wherein the apparent viscosity of the coating composition falls within about 300 to 1000 cp.

12. A prepasted substrate according to claim 9 wherein the coating composition contains the anionic polymer in an amount from about 95–5% of the total weight of the anionic and cationic polymers in the blended mixture.

13. A prepasted substrate according to claim 12 wherein the coating composition contains the anionic polymer in an amount from about 90–70% of the total weight of the anionic and cationic polymer in the blended mixture.

14. A prepasted substrate according to claim 9 wherein the particle size in the blended mixture of the anionic and cationic polymers ranges from about 2 to 5 microns.

15. A prepasted substrate according to claim 9 wherein the anionic and cationic polymers in the water phases have viscosity-average molecular weights within from abut 1 to 20 million.

16. A prepasted substrate according to claim 9 wherein the coating composition is characterized by the absence of an inventor.

17. A prepasted substrate according to claim 9 wherein in the coating composition the anionic monomers are selected from acrylic acid, methacrylic acid and their water soluble salts, the cationic monomers are selected from aminoalkyl acrylamides, aminoalkyl methacrylamides, aminoalkyl acrylates, aminoalkyl methacrylates and quaternized derivatives thereof and the non-ionic monomers are selected from acrylamide and methacrylamide.

18. A water in oil composition having an apparent viscosity within about 300 to 1000 cp and which comprises a blended mixture consisting essentially of two emulsions of substantially linear, non cross-linked, water soluble, high molecular weight, synthetic polymers, with one of said two emulsions consisting essentially of a water in oil emulsion whose water phase contains dissolved therein a substantially linear, non cross-linked, water soluble anionic polymer prepared by an inverse emulsion polymerization method with the anionic polymer being a homopolymer of an anionic monomer or a copolymer of two monomers, one selected from anionic monomers and the other selected from non-ionic monomers, and the other of said two emulsions consisting essentially of a water in oil emulsion whose water phase contains dissolved therein a substantially linear, non cross-linked, water soluble cationic polymer prepared by an inverse emulsion polymerization method with the cationic polymer being a homopolymer of a cationic monomer or a copolymer of two monomers, one selected from cationic monomers and the other selected from non-ionic monomers, and with said composition characterized after application to a substrate and drying thereon to a discontinuous film upon wetting with water of said film by swelling with water absorption and within about 30 seconds of continued wetting becoming substantially water saturated and substantially ceasing to adsorb water.

19. The composition of claim 18 in which the one and the other oil in water emulsions include as their continuous phase a paraffinic hydrocarbon oil and in which the anionic and cationic polymers prepared by said inverse emulsion polymerization method have viscosity-average molecular weights within about 1 to 20 million and were prepared with their anionic monomers selected from acrylic acid, methacrylic acid and their water soluble salts, their cationic monomer selected from aminoalkyl acrylamides, aminoalkyl methacrylamides, aminoalkyl acrylates, aminoalkyl methacrylates and quaternized derivatives thereof, and their non-ionic monomer selected from acrylamide and methacrylamide.

20. A prepasted paper substrate coated with the composition of claim 19 and with the coating after drying being a discontinuous film having a coating weight within the range of about 2 to 8 g/m$^2$.

* * * * *